(12) United States Patent
Jensen et al.

(10) Patent No.: US 9,003,339 B2
(45) Date of Patent: Apr. 7, 2015

(54) SYNTHESIS OF CLOCK GATED CIRCUIT

(71) Applicant: Cadence Design Systems, Inc., San Jose, CA (US)

(72) Inventors: Mark Jensen, Pittsburgh, PA (US); Andrew Goodrich, Campbell, CA (US); Valery Fouron, Pittsburgh, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/200,839

(22) Filed: Mar. 7, 2014

(65) Prior Publication Data

US 2014/0258948 A1    Sep. 11, 2014

Related U.S. Application Data

(60) Provisional application No. 61/774,426, filed on Mar. 7, 2013.

(51) Int. Cl.
  *G06F 17/50* (2006.01)

(52) U.S. Cl.
  CPC .......... *G06F 17/505* (2013.01); *G06F 2217/84* (2013.01)

(58) Field of Classification Search
  USPC .......................................... 716/104, 106, 108
  See application file for complete search history.

(56) References Cited

U.S. PATENT DOCUMENTS

| | | | |
|---|---|---|---|
| 4,876,640 A | 10/1989 | Shankar et al. | |
| 4,937,845 A | 6/1990 | Warner | |
| 5,042,004 A | 8/1991 | Agrawal et al. | |
| 5,084,841 A | 1/1992 | Williams et al. | |
| 5,448,606 A | 9/1995 | Snelgrove | |
| 5,541,849 A * | 7/1996 | Rostoker et al. | 716/102 |
| 5,675,622 A | 10/1997 | Hewitt et al. | |
| 5,995,035 A | 11/1999 | Signell et al. | |
| 6,337,893 B1 | 1/2002 | Pontius | |
| 6,400,735 B1 | 6/2002 | Percey | |
| 6,703,950 B2 | 3/2004 | Yi | |
| 6,762,701 B2 | 7/2004 | Jiang | |
| 6,801,143 B2 | 10/2004 | Oberai et al. | |
| 6,845,414 B2 | 1/2005 | Hsu et al. | |
| 6,857,043 B1 | 2/2005 | Lee et al. | |
| 6,907,098 B2 | 6/2005 | Nakamura | |
| 6,937,172 B1 | 8/2005 | Lowe et al. | |
| 6,970,113 B1 | 11/2005 | Lim et al. | |
| 7,071,855 B1 | 7/2006 | Sadowsky | |
| 7,148,825 B2 | 12/2006 | Jiang | |
| 7,518,535 B1 | 4/2009 | Pothireddy et al. | |

(Continued)

OTHER PUBLICATIONS

Altera; VHDL: Gray Counter; Jun. 22, 2012; 4 pages.

(Continued)

*Primary Examiner* — Sun Lin
(74) *Attorney, Agent, or Firm* — Kenyon & Kenyon LLP (57) ABSTRACT

Technology for synthesizing a behavioral description of a circuit into a structural description of the circuit is disclosed. The behavioral description may describe the circuit in terms of the circuit's behavior, or other functionality, via multiple statements, including a conditional statement. The technology includes analyzing statements upstream and/or downstream from the conditional statement, identifying one or more statements having dependency relationships with the conditional statement and inferring one or more potential clock domains for logic associated with the identified statements.

20 Claims, 9 Drawing Sheets

(56) References Cited

U.S. PATENT DOCUMENTS

| | | | |
|---|---|---|---|
| 7,526,059 | B1 | 4/2009 | Shen et al. |
| 7,683,679 | B2 | 3/2010 | Cheung et al. |
| 7,761,827 | B1 | 7/2010 | Ramachandran et al. |
| 7,769,569 | B2 * | 8/2010 | Stern .................... 703/2 |
| 7,843,762 | B2 | 11/2010 | Okada et al. |
| 7,991,104 | B1 | 8/2011 | Dahan |
| 8,006,204 | B2 | 8/2011 | Killian et al. |
| 8,149,028 | B2 | 4/2012 | Behel et al. |
| 2004/0017303 | A1 | 1/2004 | Loewen |
| 2008/0244471 | A1 | 10/2008 | Killian et al. |
| 2010/0229132 | A1 | 9/2010 | Gu et al. |
| 2011/0235459 | A1 | 9/2011 | Ware et al. |
| 2013/0278451 | A1 | 10/2013 | Kim et al. |
| 2014/0053119 | A1 * | 2/2014 | Meredith et al. ............ 716/102 |

OTHER PUBLICATIONS

Benini, L. et al.; State assignment for Low Power Dissipation; IEEE Custom Integrated Circuits Conference; 1994; 4 pages.

C. Suresh; ASIC Verification: Gray Code Counter Implementation; Jul. 23, 2008; 3 pages.

Eggermont, Robbert et al.; Profiling-based State Assignment for Low Power Dissipation; Jan. 2004; 8 pages.

El-Maleh, Aiman et al.; Finite State Machine State Assignment for Area and Power Minimization; Proceedings IEEE International Symposium on Circuits and Systems; May 21-24, 2006; 4 pages.

Gao, Feng et al; ILP-Based Optimization of Sequential Circuits for Low Power; Proceedings of the 2003 International Symposium on Low Power Electronics and Design; Aug. 25-26, 2003; 6 pages.

Gray Code Counter Generator; Jun. 20, 2012; 1 page.

Gray Code; Wikipedia; Apr. 27, 2012; 16 pages.

Gu, Junjun et al.; SSRR: Peak current reduction by simultaneous state replication and re-encoding; Proceeding of IEEE/ACM International Conference on Computer-Aided Design (ICCAD); Dec. 2010; 8 pages.

Koegst, Manfred et al.; Multi-Criterial State Assignment for Low Power FSM Design; 1998; 8 pages.

Koegst, Manfred, et al.; A Strategy for Low Power FSM-Design by Reducing Switching Activity; Proc. of the 7th International Workshop of Power and Timing Modeling, Optimization and Simulation; 1997; 10 pages.

Maxfield, Clive; Gray Code Fundamentals—Part 2; EE Times; Jun. 5, 2011; 7 pages.

Olson, Eric Peter; Abstract of "Optimal state assignment of sequential circuits using a genetic local search with flexible cost functions"; 1995; 2 pages.

Sutter, Gustavo, et al.; FSM Decomposition for Low Power in FPGA; Field-Programmable Logic and Applications: Reconfigurable Computing is Going Mainstream; 2002; 10 pages.

Tsui, Chi-Ying et al.; Exact and Approximate Methods of Switching Activity Estimation in Sequential Logic Circuits; Proceedings of the 31st Design Automation Conference; 1994; 24 pages.

Veeramachaneni, Vamshi et al.; Re-encoding for Low Power State Assignment of FSMs; ISLPED '95 Proceedings of the 1995 International Symposium on Low Power Design; 1995; 6 pages.

Venkataraman, Ganesh, et al.; GALLOP: Genetic Algorithm based Low Power FSM Synthesis by Simultaneous Partitioning and State Assignment; Proceedings 16th International Conference on VLSI Design; Jan. 4-8, 2003; 6 pages.

Yuan, Lin et al.; FSM Re-Engineering and its Application in Low Power State Encoding; Design Automation Conference, 2005; Proceedings of the ASP-DAC 2005, Asia and South Pacific; Jan. 18-21, 2005; 6 pages.

Yuan, Lin et al.; FSM Re-Engineering for Low Power State Encoding; Proceedings International Workshop on Logic Synthesis; Jun. 2004; 8 pages.

* cited by examiner

SYNTHESIS OF CLOCK GATED CIRCUIT

CROSS-REFERENCE TO RELATED APPLICATION

This application claims priority to U.S. Prov. Pat. App. No. 61/774,426 filed on Mar. 7, 2013, entitled "METHODS AND APPARATUS FOR OPTIMIZING CLOCK GATING AND FINITE STATE MACHINES". The entirety of this aforementioned application is incorporated herein by reference.

BACKGROUND

High level synthesis (HLS) technology is often employed in the design and verification of integrated circuits (ICs) such as application specific integrated circuits (ASICs), field programmable gate arrays (FPGAs), other programmable devices, and/or the like. For example, HLS technology may significantly reduce the time and effort involved in designing and verifying complex circuits.

As one example, HLS technology may be employed to transform a relatively abstract description of a circuit into a less abstract description of the circuit. For example, the relatively abstract description of the circuit may be a behavioral design description. However, HLS technology may also be employed for relatively abstract descriptions specified in other types of hardware description languages such as system-level modeling languages, and the like. In addition, HLS technology may generate the less abstract description of the circuit in any suitable description language. For example, the less abstract description of the circuit may include a register-transfer level (RTL) description, gate level description of the circuit, and/or the like.

In certain designs/circuits, clock signals to certain portions of the circuit may be selectively provided, selectively enabled, or otherwise gated. Such clock gating may affect circuit power consumption, e.g., by affecting the amount of circuitry that is clocked at particular times.

BRIEF DESCRIPTION OF THE DRAWINGS

Non-limiting and non-exhaustive examples of the disclosed technology are described with reference to the following drawings. In the drawings, like reference numerals refer to like parts throughout the various figures unless otherwise specified. These drawings are not necessarily drawn to scale.

For a better understanding of the disclosed technology, reference will be made to the following Detailed Description, which is to be read in association with the accompanying drawings, wherein.

DETAILED DESCRIPTION

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of embodiments of the technology. It is intended that the terminology used in this disclosure be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. For example, the term "based on" or "based upon" is not exclusive and is equivalent to the term "based, at least in part, on" and includes being based on additional factors, some of which are not described herein. References in the singular are made merely for clarity of reading and include plural references unless plural references are specifically excluded. The term "or" is an inclusive "or" operator and is equivalent to the term "and/or" unless specifically indicated otherwise. As used herein, the terms "component" and "system" are intended to encompass hardware, software, or various combinations of hardware and software. Thus, for example, a system or component may be a process, a process executing on a computing device, the computing device, or a portion thereof.

As used herein, the term "clock gating" refers to the selective enabling of, selective control of, and/or other gating of a clock signal based on a condition. The term "gated clock" or "gated clock signal" refers to a clock signal that is derived from a source clock signal by gating the source clock signal based on a condition. As used herein, the term "clock domain" refers to a group of logic and/or other circuitry that is clocked by the same clock signal. As used herein, the term "gated clock domain" refers to a clock domain that is clocked by a gated clock signal. As used herein, the term "optimize," "optimizes," "optimized," "optimizing," "optimization," and similar do not necessarily refer to an "optimal" or "best" outcome, variation, solution, and/or the like. Rather, these terms are used to connote an improvement relative to a baseline, starting point, and/or the like.

Technology for synthesizing a behavioral description of a circuit into a structural description of the circuit is disclosed. The behavioral description may describe the circuit in terms of the circuit's behavior, or other functionality, via multiple statements, including a conditional statement. The technology includes analyzing statements upstream and/or downstream from the conditional statement, identifying one or more statements having dependency relationships with the conditional statement and inferring one or more potential clock domains for logic associated with the identified statements.

The technology may be employed to perform a high level synthesis (HLS) of a relatively abstract description of the circuit into a less abstract description of the circuit for physical implementation in target hardware (e.g., an application specific integrated circuit (ASIC), field programmable gate arrays (FPGA), programmable logic device (PLD), etc.). In performing such a synthesis, the inference and assignment of clock domains may enable optimization of circuit power consumption, e.g. by selectively disabling portions of circuits when the input and/or output of that portion is static. In this and other manners, the gates associated with the portion of the circuit may consume less power. In addition, the power dissipated by driving clock signals may also be reduced, e.g., because a gated clock signal may not be driven at all times.

Figure 1:
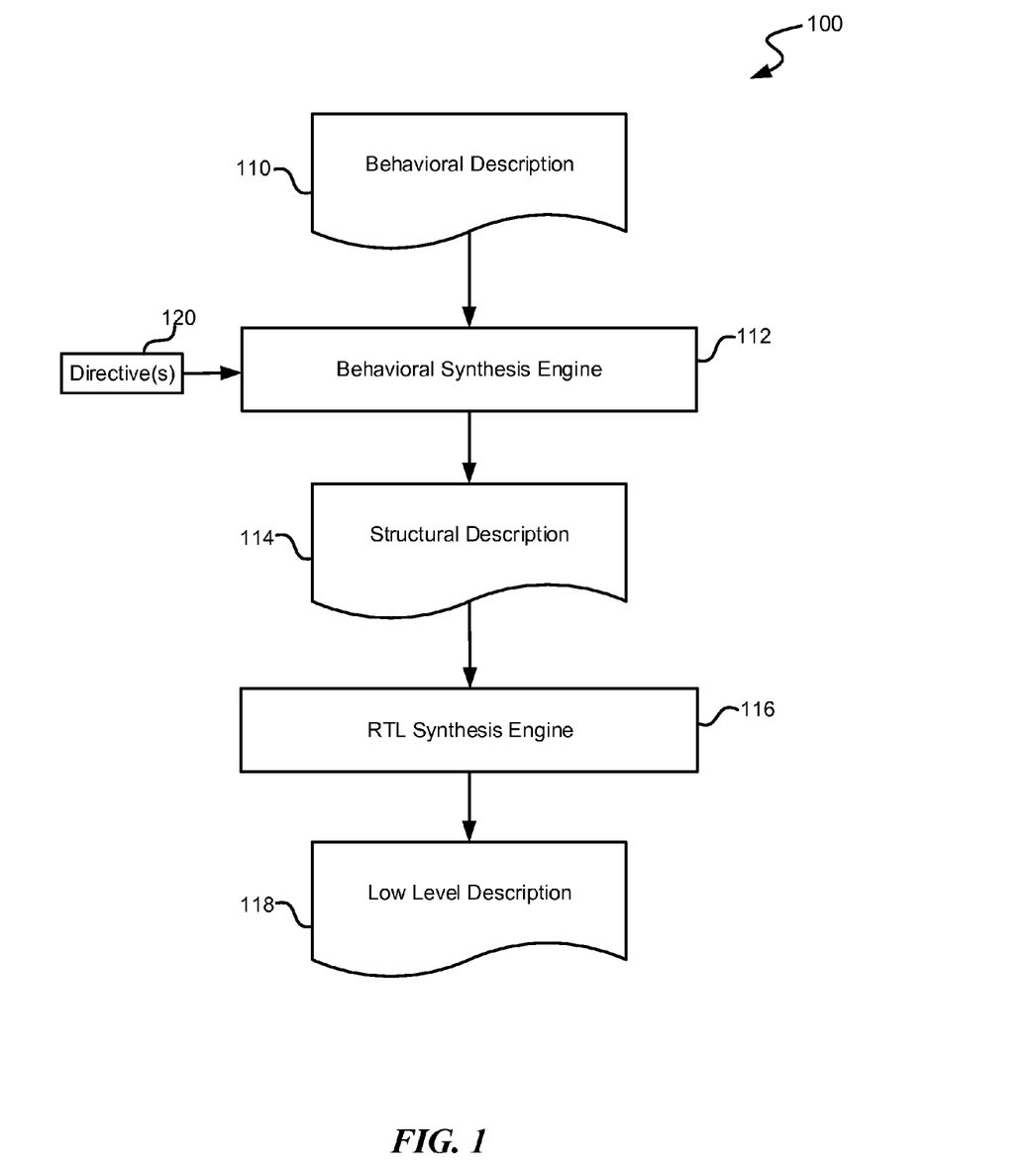
FIG. 1 is a diagram illustrating an overview of a circuit synthesis flow according to aspects of the technology.

FIG. 1 is an overview 100 of a circuit synthesis flow according to aspects of the technology. As shown, overview 100 includes behavioral description 110, behavioral synthesis engine 112, structural description 114, register transfer level (RTL) synthesis engine 116, and low level description 118. In this example, behavioral description 110, structural description 114, and low level description 118 may all be descriptions of the same circuit, but at different levels of abstraction. As illustrated, directive 120 may also be part of overview 100.

In the example of FIG. 1, behavioral description 110 describes the circuit by way of statements that specify functionality that is to be provided by the circuit or that otherwise define operations that are to be performed by the circuit. In overview of 100, at least one of these statements is a conditional statement, i.e., a statement that defines an operation that is to be performed by the circuit if an associated condition is met. For example, a conditional statement may be associated with an "if" construct, a "case" construct, a "switch" construct, a "while" construct, and/or the like. In addition, a conditional statement may be an above-listed construct, include an above-listed construct, be a portion of an above-listed construct (e.g., a portion that defines the operation to be performed if the condition is met), and/or the like.

In the example of overview 100, behavioral description 110 also includes at least one other statement that has a dependency relationship with the conditional statement. Such statements may be downstream from the conditional statement and/or upstream from the conditional statement. For example, a "downstream statement" may be a statement that represents "downstream" logic that is dependent on the "conditional" logic represented by the conditional statement. In other words, the downstream logic may receive input from the conditional logic. Likewise, an "upstream statement" may be a statement that represents "upstream" logic upon which the "conditional" logic depends. In other words, the upstream logic may provide input to the conditional logic. In addition, in certain embodiments of the technology, "upstream statements" may include only those statements that represents logic upstream from the conditional logic where the output of the upstream logic is only employed by the conditional logic or other logic in the same clock domain as the conditional logic. In other words, in such embodiments, "upstream statements" would not include representations of logic that feeds the conditional logic as well as other logic that is independent from the conditional logic.

To more clearly illustrate the concept of dependencies, the following example of pseudo-code is explained below:

```
1:    b = x * y;           // upstream statement
2:    if (COND) then {     // conditional statement, first line
3:       c = a + b; }      // conditional statement, second line
4:       else { }          // conditional statement, third line
5:    foo = c * 4          // downstream statement
```

In this example, a conditional statement is set forth on lines 2, 3, and 4. Of these lines, the condition COND is set forth on line 2. Further, an upstream statement is set forth on line 1, e.g., because "b" is an input used by the conditional statement to determine "c[.]" In contrast, a downstream statement is set forth on line 5, e.g., because the output of the conditional statement "c" is used as an input in the determination of "foo[.]"

By way of example, behavioral description 110 may be input to behavioral synthesis engine 112 as one or more source files. For example, these source files may be in SystemC, SpecC, C++, variants thereof, and/or any other suitable language.

In one non-limiting example, directive 120 may also be input to behavioral synthesis engine 112. Directive 120 may be user input, metadata, a pragma, a pre-processor directive, an annotation in behavioral description 110, and/or the like, and may complement, expand upon, or modify behavioral description 110. Directive 120 may also be provided by a user, e.g., as a user directive. In one non-limiting example, directive 120 serves as or includes one or more of the following: timing constraints, area constraints, power constraints, performance constraints, optimization constraints, and the like. Directive 120 may also serve as or include a construct defining one or more clock domains, one or more gated clock domains, one or more branches of a clock tree, an indication of the maximum allowable number of clock domains, an indication for invariant conditions, and/or the like. As a more specific example, directive 120 may indicate the maximum number of clock domains that may be implemented. In another example, directive 120 may indicate that a particular condition is loop invariant.

Behavioral synthesis engine 112 may receive behavioral description 110 and directive 120 as input, and synthesize behavioral description 110 into structural description 114. However, behavioral synthesis engine 112 may alternately synthesize a description at any suitable level of abstraction including a description at the same level of abstraction or at any other suitable level of abstraction. Behavioral synthesis engine 112 may further receive a technology library representing resources associated with one or more target hardware platforms into which the circuit could or would be physically implemented.

The synthesis performed by behavioral synthesis engine 112 may include synthesis of optimized clock domains and clock gating structures for the circuit to be implemented. For example, behavioral synthesis engine 112 may synthesize the optimized clock domains and clock gating structures based on power considerations (e.g., static power dissipation, dynamic power dissipation, peak current, etc.).

Behavioral synthesis engine 112 may additionally generate structural description 114. In one non-limiting example, behavioral synthesis engine 112 generates an RTL output file that describes the circuit to be implemented. However, other forms of output files are also contemplated.

As illustrated in FIG. 1, structural description 114 describes a circuit in terms of the structure that is to be used to implement that circuit. In one specific example, structural description 114 describes the circuit in a hardware description language (HDL), such as Verilog, VHDL, and/or the like. However, structural description 114 may also describe the circuit in a RTL language, a gate level language, a net list, and/or the like. For example, structural description 114 may describe the circuit in terms of components and the connections thereto. Depending on the hardware technology into which the circuit is to be implemented, structural description 114 may be directly implemented into the target hardware (e.g., fabricated, downloaded, etc.) or be further processed prior to implementation (e.g., place and route, simulation, verification, physical synthesis, etc.). While the output of behavioral synthesis engine 112 is described as a structural description, other descriptions may be outputs of other behavioral synthesis engines.

Structural description 114 may also include a structural description of the logic for the conditional statement and the logic for the downstream statement and/or the upstream statement from behavioral description 110. This portion of structural description 114 may also include description of one or more clock gating structures associated with such logic. Additionally, a clock gating structure may include an integrated clock gating cell (ICG) and/or other suitable structures.

As illustrated in FIG. 1, structural description 114 may further be processed by RTL synthesis engine 116 into low level description 118. For example, RTL synthesis engine 116 may perform part of a lower level synthesis process and output a gate level netlist for use in a subsequent physical synthesis. In another example, RTL synthesis process 116 may incorporate physical and/or layout processes, and output a file ready for fabrication in an integrated circuit or for programming into a programmable device.

Figure 2:
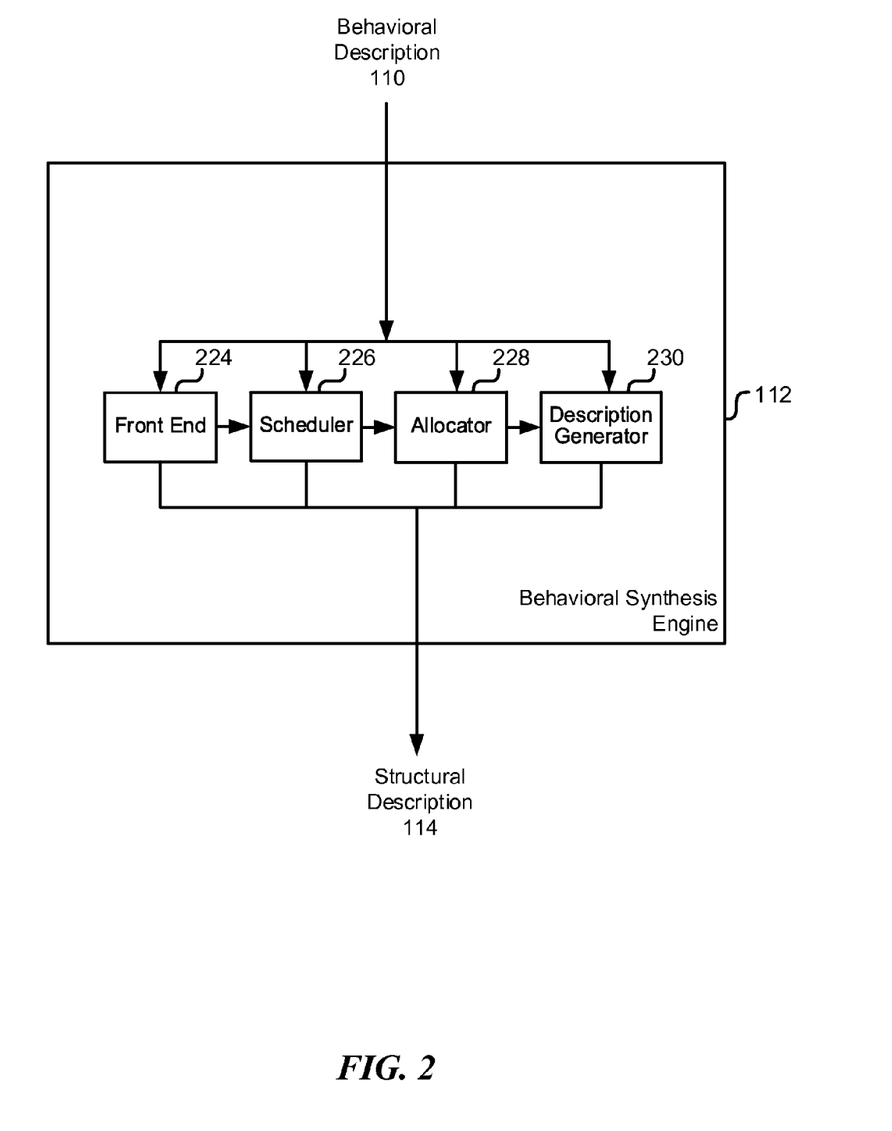
FIG. 2 is a block diagram illustrating components of behavioral synthesis engine 112 of FIG. 1 according to aspects of the technology.

FIG. 2 illustrates components of behavioral synthesis engine 112 of FIG. 1. As shown in FIG. 2, behavioral synthesis engine 112 includes front end 224, scheduler 226, allocator 228, and description generator 230.

As shown in FIG. 2, behavioral synthesis engine 112 receives behavioral description 110 of a circuit via front end 224. As previously discussed, behavioral description 110 includes a conditional statement and one or more additional statements that have a dependency relationship with the conditional statement. Although not shown in FIG. 2, behavioral synthesis engine 112 may receive additional information such as directive 120 of FIG. 1 and/or one or more libraries of technological or hardware resources, and employ such additional information in synthesizing a circuit.

Front end 224 may perform lexical, syntax, and/or semantic analysis on behavioral description 110 and translate behavioral description 110 into an intermediate representation of the circuit. The intermediate representation may be a data structure, or other suitable representation of the circuit described by behavioral description 110. For example, the intermediate representation may be a control-data flow graph (CDFG), a data flow graph (DFG), control flow graph (CFG), and/or the like.

Front end 224 may also identify one or more conditional statements, for example, via an analysis of the intermediate representation. In one example, front end 224 may employ a syntactical analysis to identify conditional statements. However, other processes for identifying conditional statements may also be employed. For example, front end 224 may also identify conditional statements by identifying branch points in a CDFG, DFG, CFG, and/or the like. Additionally, a conditional statement may be specified via directive 120. Front end 224 may flag the identified conditional statement as a conditional statement. For example, front end 224 may assign a conditional attribute to the identified conditional statement.

Front end 224 may also identify the condition associated with the conditional statement. For example, the condition may be a portion of the conditional statement that is evaluated to determine whether the operation defined by the conditional statement is to be performed. Additionally, the condition may represented in behavioral description 110 as a logical expression that evaluates to either logical TRUE or logical FALSE, and may be represented in structural description 114 as an enable signal or other clock gating signal, as a combinatorial circuit that generates a clock gating signal, as a sequential circuit that that generates a clock gating signal, as another circuit, as a portion of one of the mentioned circuits, and/or the like. Front end 224 may also flag an identified condition as a guard condition, e.g., via assignment of a guard condition attribute.

In one non-limiting example, front end 224 may identify more than one conditions associated with the conditional statement. For example, if the conditional statement is part of a nested and/or serial construct (e.g., representing a group of serial conditions, a group of conditions that can be AND'ed together, etc.), front end 224 may identify multiple conditions and combine one or more of the multiple identified conditions into a combined guard condition. Likewise, front end 224 may perform a logical "or" on conditions. For example, front end 224 may logically "or" conditions that are complementary and/or parallel to each other into a combined guard condition.

To more clearly illustrate these concepts, the following example of pseudo-code is explained below:

| 1.  | d = 0;                              |
| 2.  | x = a + b;                          |
| 3.  | y = a * b;                          |
| 4.  | z = a / b;                          |
| 6.  |                                     |
| 7.  | if (COND1) then { d = z + x; }      |
| 8.  | if (COND2) then { d = z + y + x; }  |
| 9.  |     else { d = z; }                 |
| 10. |                                     |
| 11. | if ( COND3 ) { out = d; }           |

In this pseudo-code, there are multiple conditions (e.g., COND1, COND2, and COND3) that front end 224 may analyze in determining whether or not the output of the operations associated with "x," "y," and/or "z" are to be used in providing "d" and/or "out." As such, potential guard conditions for "x," "y," and "z" may be as follows:

x: COND3 && (COND1 || COND2);
y: COND3 && COND2; and
z: COND3.

Also, "a," "b," "c," "x," "y," "z," and "d" may be used only by the above illustrated pseudo-code, or the above-listed gating conditions may be suitably modified, for example, if one or more of "a," "b," "c," "x," "y," "z," and "d" is used in additional portions of pseudo-code for the same circuit.

In this example, COND1 and COND2 are complementary and/or parallel to each other with respect to "x." In other words, if COND1 and/or COND2 is logically TRUE then "x" will be relied upon for a downstream operation (e.g., determination of "d," or determination of "d" and of "out"). Likewise, COND2 and COND3 are nested and/or serial conditions with respect to "y." In other words, "y" is relied upon for downstream operations (e.g., determination of "d" and "out") if both COND2 and COND3 are logically TRUE.

As alluded to above, front end 224 may combine and/or logically "or" multiple conditions together into combined guard conditions. For example, front end 224 may form combined guard conditions that optimize and/or balance the size of the clock gating domains, the complexity of the gating conditions, and/or delays associated with gating conditions against the completeness/thoroughness of gating. As one example, conditions that are always or almost always true may be omitted from a combined guard condition, for example, because the power reduction associated with inclusion of that condition would not justify the additional circuit complexity associated with gating based on that condition. Also, optimization and/or balancing for combined guard conditions may be based on information received by front end 224, e.g., via directive 120.

Front end 224 may also selectively disregard one or more conditions in forming a combined guard condition, or select one or more conditions to serve as a guard condition or as parts of a combined guard condition. In forming combined guard conditions, front end 224 may determine that certain conditions are not to be included in a combined guard condition (e.g., based on optimization/balancing of factors). In addition, front end 224 may determine that if a particular condition is to be omitted from a combined guard condition, then all other conditions in complementary and/or parallel relationship with the particular condition are also to be omitted from the combined guard condition. However, in this example, front end 224 may form a combined guard condition for nested/serial conditions by omitting any one or more nested/serial conditions irrespective of the nested/serial relationships.

Further, front end 224 may identify other statements upstream and/or downstream from the conditional statement that have dependency relationships with the conditional statement. In one non-limiting example, front end 224 identifies these other statements based on a syntactical analysis of behavioral description 110, based on a syntactical analysis of an intermediate representation of the circuit, based on an analysis of one or more flow graphs representing the circuit, and/or the like. For example, front end 224 may identify such statements by analyzing the intermediate representation for statements that only feeds a branch associated with the conditional statement (i.e. an upstream statement), and/or for a statement that receives data from the branch (i.e., a downstream statement). These statements may also be flagged with a conditional attribute, and may be associated with a guard condition attribute that reflects the condition with which they are associated.

Scheduler 226 may receive an intermediate representation from front end 224 that includes, for example, indications of the conditional and guard condition attributes. In one example, scheduler 226 may receive an untimed or unscheduled CDFG or as such an intermediate representation. Scheduler 226 may also receive timing constraints, area/resource constraints, power constraints, performance constraints, or a combination thereof, as indicated in directive 120. In one example, scheduler 226 considers the constraints in scheduling the circuit.

In one non-limiting example, scheduler 226 may identify an opportunity to optimize clock gating if the same guard condition is assigned to more than one statement. In this example, scheduler 226 may infer one or more potential clock domains for logic associated with the conditional statement and the identified other statements. For example, scheduler 226 may infer multiple potential clock domains for such logic, and each of the potential clock domains may be clocked by a clock that is gated by the condition, or be clocked by another clock that is derived from the gated clock (e.g., a delayed version of the gated clock, a version of the gated clock that is then gated by another condition, etc.), or by a clock that is gated by a derivative of the condition (e.g., gated by a delayed version of the condition, gated by a logical combination of the condition with another condition, etc.).

Scheduler 226 may also determine if a condition is invariant across the one or more potential clock domains. If the condition is determined to be invariant (e.g., unchanged) across the one or more of the potential clock domains, then scheduler 226 may combine the one or more potential clock domains into one clock domain which may be clocked by a clock signal that is gated by the invariant guard condition. In this example, the one clock domain may be larger than the individual potential clock domains, and may thus reduce power consumption. In another example, scheduler 226 may evaluate the entire design in determining whether the guard condition is invariant. Similarly, scheduler 226 may further determine whether a condition is loop invariant (i.e., whether a value of the condition remains the same for each iteration of a loop.) If the condition is loop invariant, similar combinations of potential clock domains may be performed. As another example, scheduler 226 may determine that a condition is invariant if (1) the internal symbols that the condition depends upon are not to be overwritten with different values during the period of invariance and (2) the external signals/ports are specified (e.g., via directive 120) to be defined, correct, and unchanging during the period of invariance.

In one example, scheduler 226 then schedules the circuit by determining a number of pipelined stages for the circuit or portion thereof and assigning portions of circuitry (e.g., portions of circuitry associated with various statements of behavioral description 110) to pipeline stages associated with one or more of the inferred clock domains. In other words, this assignment may define a clock cycle in which the operation defined by that statement is performed relative to another clock cycle in which an operation defined by another statement is performed. Scheduler 226 may further assign the circuitry for conditional statements to pipeline stages at cycle boundaries. For example, in cases where circuitry for a conditional statement is assigned to a cycle boundary, the register storing the result may be clock gated because it stores the value of a guarded operation.

Further, scheduling by scheduler 226 may include assigning portions of circuitry associated with the downstream and/or upstream statements to other pipelines states. For example, such pipeline stages could be in a different clock domain than that for the conditional statement. Additionally, the various clock domains may be clocked by way of a clock signal that is gated by the condition, or that is gated by a derivative of the condition. In one non-limiting example, scheduler 226 may also perform iterative scheduling. Such iterative scheduling may include running a scheduling process multiple times, running a front end process and a scheduling process multiple times, and/or the like.

Scheduler 226 may also determine a number of gated clock domains into which portions of circuit may be scheduled. For example, this determination may be based on one or more constraint criteria, such as timing constraint, area constraint, performance constraint, power constraint, and/or the like. For example, scheduler 226 may determine the number of gated clock domains based on trade-offs between, for example, circuit size, static power consumption, and dynamic power consumption. More specifically, scheduler 226 may balance the complexities associated with increased circuit size and static power consumption generally associated with additional clock domains against the higher dynamic power consumption generally associated with fewer clock domains.

In one example, scheduler 226 may first infer three potential gated clock domains: a first gated clock domain for a first circuit portion associated with an first statement, a second clock domain for a second circuit portion associated with a second statement, and a third clock domain for a third circuit portion associated with the conditional statement. Based on one or more constraint criteria, scheduler 226 may then select only two of the three potential gated clock domains for use in scheduling the circuitry and schedule the logic preciously associated with the three potential clock domains into the two selected clock domains. In this example, the circuit portion associated with the non-selected potential clock domain may also be disassociated from the non-selected potential clock domain.

Allocator 228 may receive a scheduled intermediate representation of the optimized circuit, and allocate hardware resources to implement the circuit. The hardware resources may include registers, functional units, memory units, as well as communication channels. In one non-limiting example, allocator 228 maps scheduled intermediate representations of the circuit to hardware resources associated with the target hardware.

Description generator 230 may then receive a scheduled and allocated intermediate representation of the circuit, and generate structural description 114 of the circuit. The scheduled and allocated intermediate representation of the circuit may incorporate design decisions regarding scheduling and resource allocation, which may implicitly incorporate design decisions regarding clock gating optimization. In one example, description generator 230 may also apply additional decisions made for design implementation in generating structural description 114.

In one non-limiting example, behavioral synthesis engine 112 may include additional, fewer, and/or other blocks. In addition, behavioral synthesis engine 112 may be organized in any other suitable manner. Behavioral synthesis engine 112 may also be implemented in hardware, firmware, software, and/or combinations thereof.

Figure 3A:
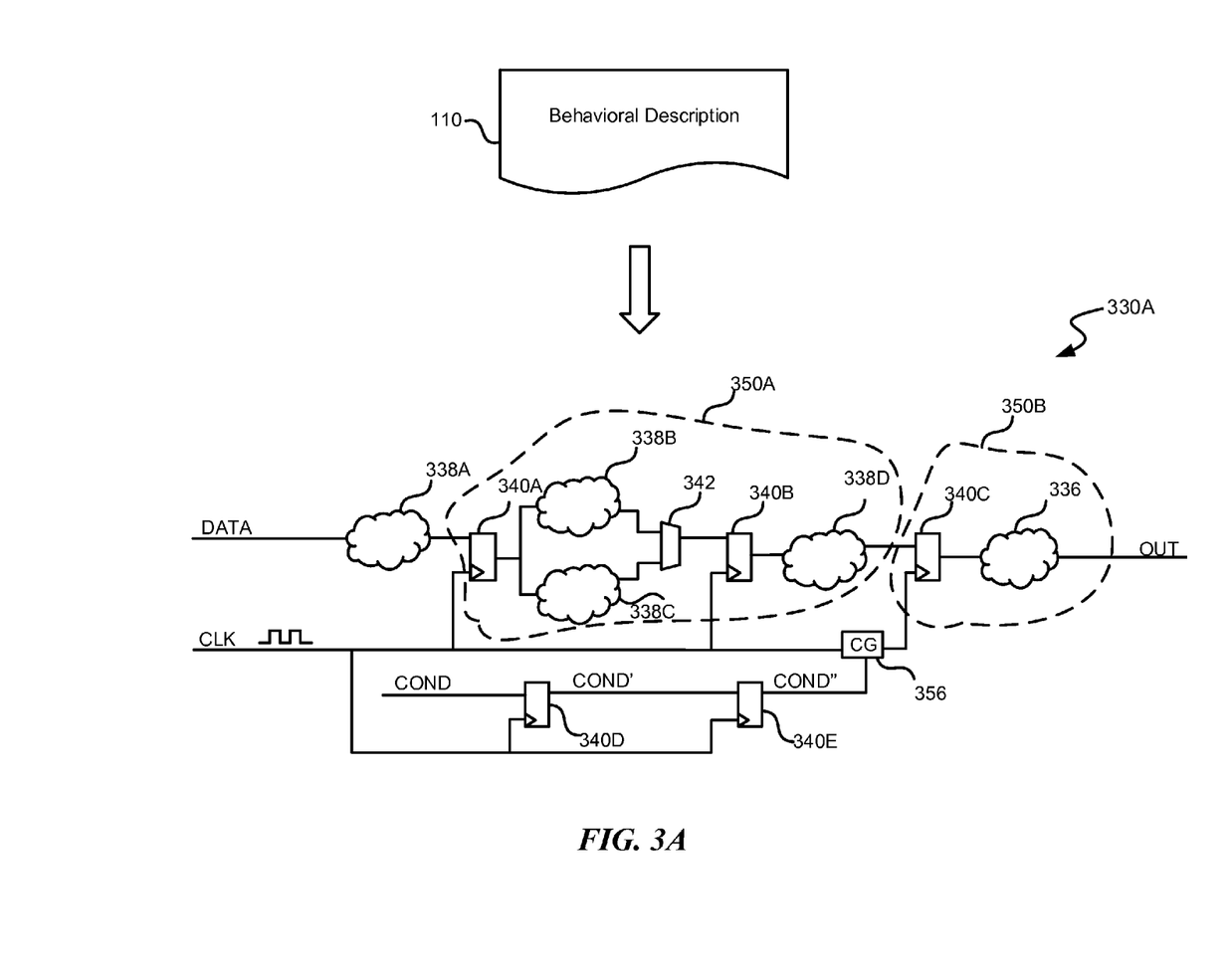
FIGS. 3A, 3B, 3C, and 3D are diagrams illustrating transformations of behavioral descriptions into synthesized circuits according to aspects of the technology.

FIG. 3A illustrates a transformation of behavioral description 110 into circuit 330A. Circuit 330A receives data path input DATA and condition input COND, as well as input clock signal CLK. Synthesized circuit 330A also provides output OUT. Circuit 330A includes upstream circuitry 338A-D, datapath registers 340A-C, multiplexer 342, and conditional circuitry 336. Circuit 330A also includes clock control registers 340D and 340E and clock gating circuit 356.

In this example, conditional circuitry 336 was synthesized from a conditional statement, upstream circuitry 338A-D was synthesized from one or more statements upstream from the conditional statement, and registers 340A-E were added by scheduler 226 during scheduling. As shown in FIG. 3A, circuit 330A is organized into two clock domains, e.g., clock domains 350A and 350B. In this example, datapath registers 340A and 340B (as well as upstream circuitry 330A-D and multiplexer 342) are in clock domain 350A while datapath register 340C (as well as conditional circuitry 336) is in clock domain 350B. In addition, clock control registers 340D and 340E are included to synchronize condition input COND to the pipeline length of the datapath of circuit 330A. Further, clock gating circuit 356 drives a clock signal to clock domain 350B based on input clock signal CLK and the condition signal COND" which is derived from condition input COND. As illustrated in FIG. 3A, COND' and COND" are derivatives of COND, i.e., they are delayed versions of COND.

In operation, circuit 330A may consume less power than a non-optimized circuit that provides the same functionality. In particular, the power consumption of circuit 330A may be lower than the non-optimized circuit because the clock signal to register 340C is gated based on condition signal COND". As such, register 340C and conditional circuitry 336 may not switch when COND" is low or otherwise not enabled.

Figure 3B:
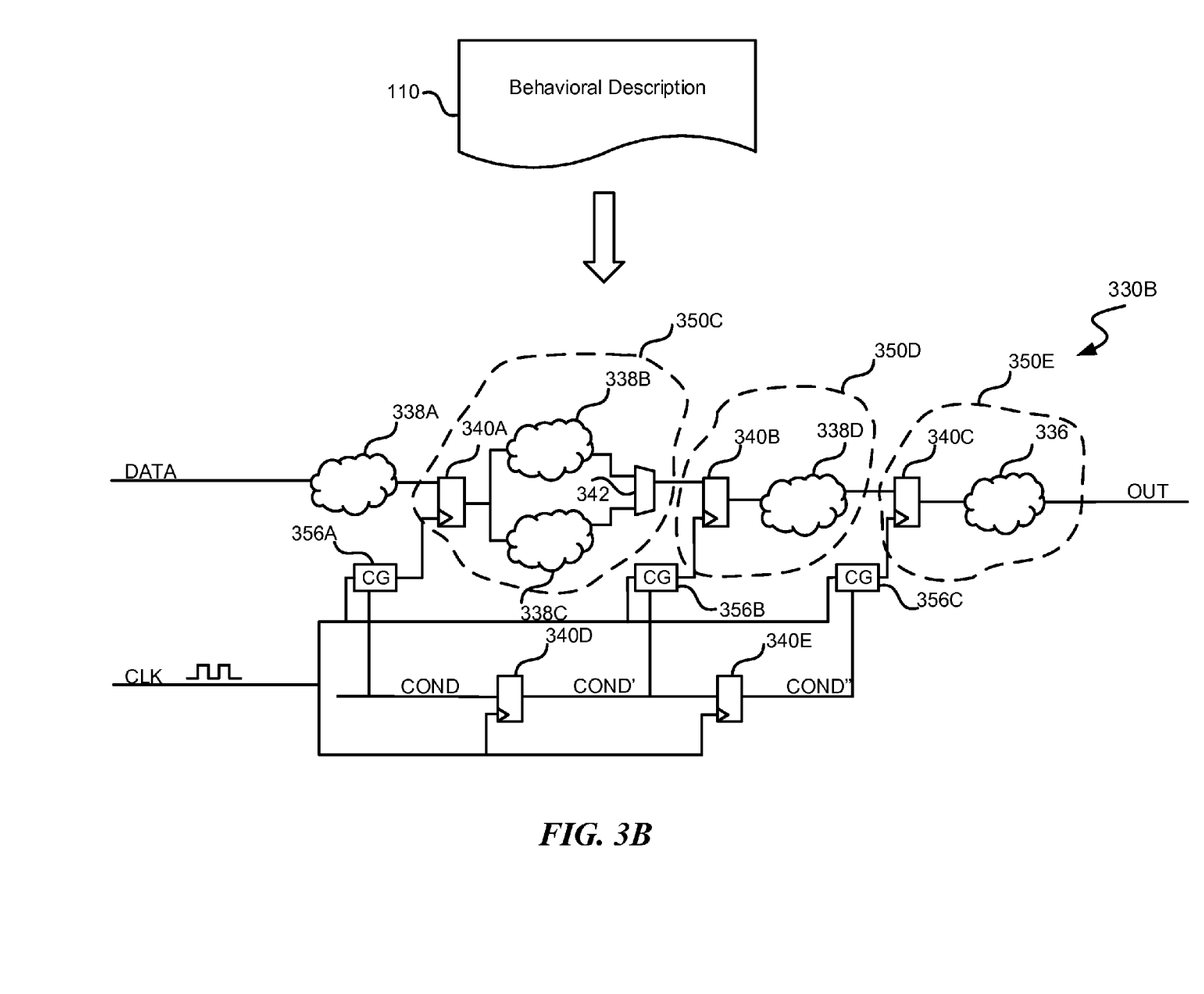

FIG. 3B illustrates a transformation of behavioral description 110 into circuit 330B. Relative to circuit 330A of FIG. 3A, circuit 330B is organized into three clock domains 350C-E, and includes clock gating circuits 356A-C (instead of clock gating circuit 356 of FIG. 3A). Relative to circuit 330A, the division of circuit 330B into additional clock domains may provide further reductions in dynamic power consumption, e.g., because the conditional clocking is more granular than that for circuit 300A.

Figure 3C:
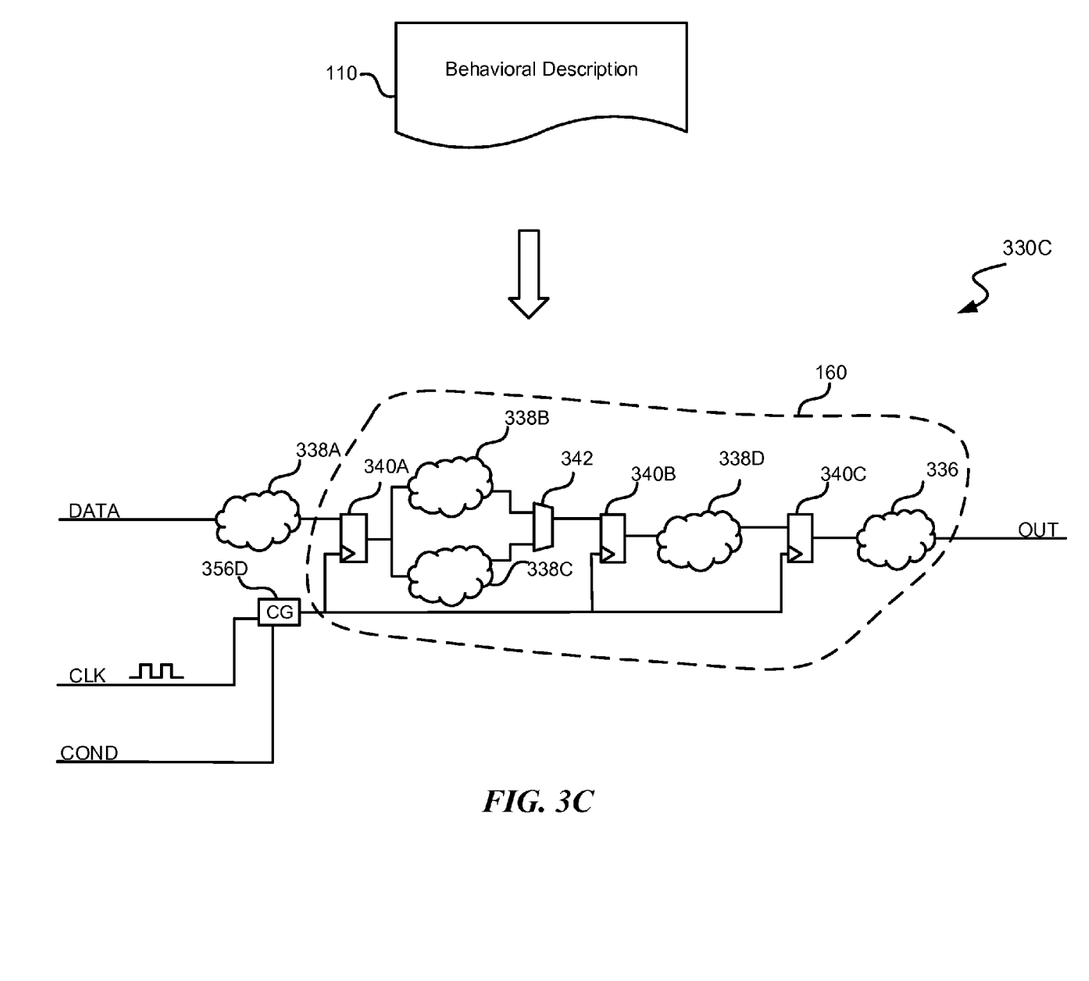

FIG. 3C illustrates a transformation of behavioral description 110 into circuit 330C. Relative to circuit 330A of FIG. 3A and circuit 330B of FIG. 3B, circuit 330C is organized into a single clock domain 360 that is driven by clock gating circuit 356D. As one example, circuit 330C may be synthesized in response to a determination, e.g., by front end 224, that the condition input COND is loop invariant and/or invariant. Also, the dynamic power consumption of circuit 330C may be similar to that of circuit 330B, e.g., due to the loop invariance. However, circuit 330C may be implemented with a smaller circuit than needed for circuit 330B. Accordingly, static power dissipation may be lower for circuit 330C relative to circuit 330B.

Figure 3D:
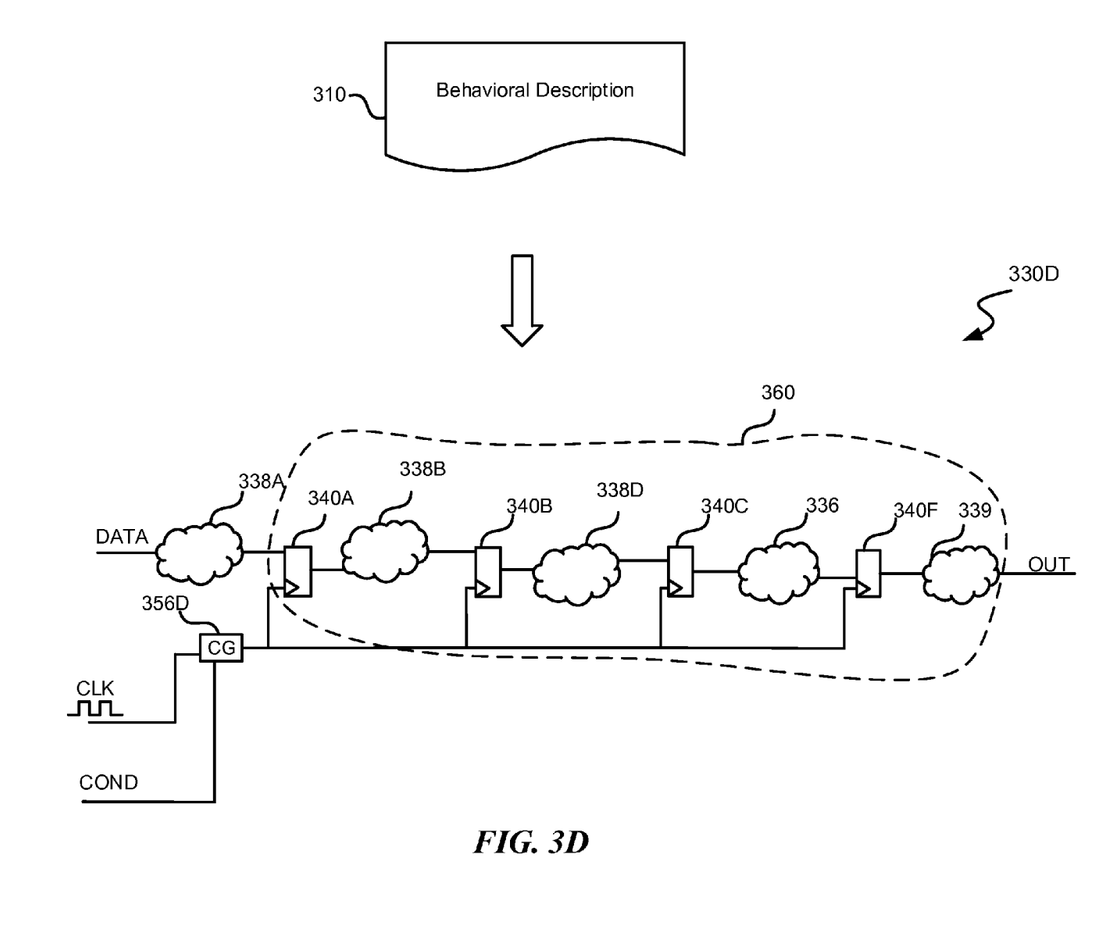

FIG. 3D illustrates a transformation of behavioral description 310 into circuit 330D. In the example of FIG. 3D, behavioral description 310 includes one or more downstream statements associated with downstream circuitry 339 as well as one or more upstream statements associated with upstream circuitry 338A-338D. Circuit 330D also includes registers 340A-340F as well as clock gating circuit 356D. Further, circuit 330D was synthesized based on a determination that condition input COND is loop invariant and/or invariant. Similar to circuit 330C in FIG. 3C, circuit 330D is organized into a single clock domain 360 that is driven by clock gating circuit 356D. Unlike circuit 330C, however, the clock domain 360 encompasses downstream circuitry 339.

Figure 4:
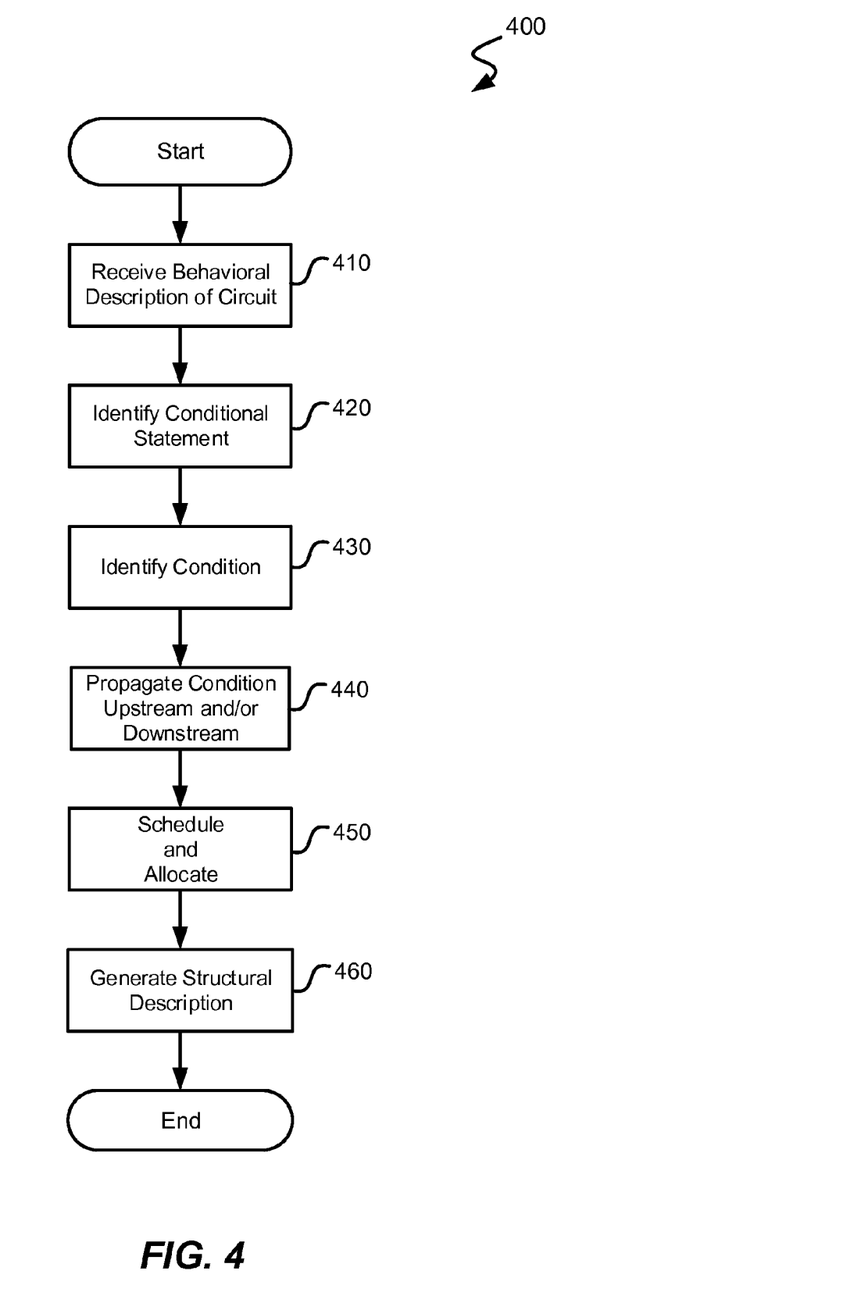
FIG. 4 is a logical flow diagram illustrating a process for synthesizing a behavioral description of a circuit into a structural description of the circuit according to aspects of the technology.
Figure 5:
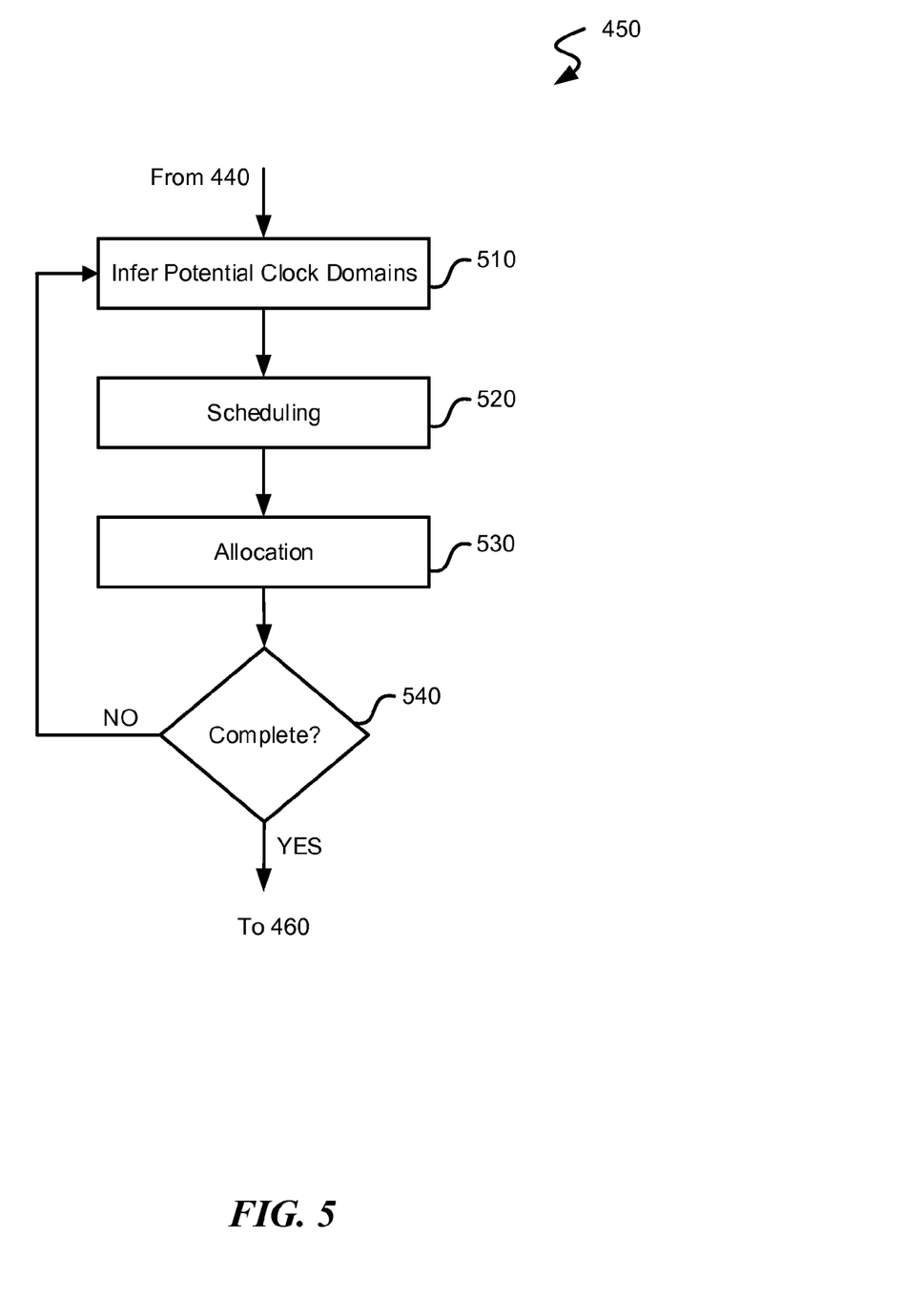
FIG. 5 is a logical flow diagram illustrating a process for scheduling and allocating logic according to aspects of the technology.

FIGS. 4 and 5 are logical flow diagrams illustrating process 400 for synthesizing a behavioral description of a circuit into a structural description of the circuit. For clarity, this process, as well as other processes that are described herein, are described in terms of operations performed in particular sequences by particular devices or elements of a system. However, it is noted that other processes are not limited to the stated sequences, devices, or elements. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, elements, or systems, whether or not such devices, elements, or systems are described herein. These processes may also be embodied in a variety of ways. For example, they may be embodied on an article of manufacture, e.g., as computer-readable instructions stored in a computer-readable storage medium or be performed as a computer-implemented process. As an alternate example, these processes may be encoded as computer-executable instructions and transmitted via a communications medium.

Process 400 begins at 410 where a behavioral description of a circuit is received. The behavioral description may be embodied as one or more source files of a high level language, such as SystemC, SpecC, C++, variants thereof, and/or the like. As one example, behavioral description 110 (FIG. 1) may be received at behavioral synthesis engine 112 (FIG. 1). In addition, the behavioral description received at 410 includes a conditional statement. Further, a directive, for example a user directive, may also be received at 410.

Process 400 then continues to 420 where a conditional statement is identified, for example, by front end 224 via a syntactical analysis and/or branch point analysis of a representation of the circuit. Additionally, identified conditional statements may also be flagged at 420, e.g., via assignment of a conditional attribute to an identified conditional statement. From 420, processing flows to 430 where the condition associated with the conditional statement is identified. The identified condition may also be flagged, e.g., via assignment of a guard condition attribute. Likewise, combined guard conditions may be determined.

Process 400 continues to 440 where statements upstream and/or downstream from the conditional statement that have a dependency relationship with the conditional statement are identified. These additional statements may also be flagged, e.g., via assignment of the same guard condition attribute assigned to the condition identified at 430.

Process 400 continues to 450 where the circuit is scheduled and allocated. One example process for such scheduling and allocation is illustrated in FIG. 5. In the example of FIG. 5, 450 begins at 510 where one or more potential clock domains for the logic associated with the conditional statement and the identified other statements are inferred. Each of the inferred potential clock domains may be clocked by a clock signal gated by the identified condition, or by a derivative thereof.

From 510, processing flows to 520 where the circuit is scheduled based on at least one or more design constraints, including the inferred potential clock domains. Design constraints may also include timing constraints, area constraints, power constraints, performance requirements, and/or the like. The scheduling of 520 may also include determining a number of pipelined stages for the circuit or a portion thereof and assigning portions of circuitry to pipeline stages associated with one or more of the inferred potential clock domains.

From 520 processing flows to 530 where the scheduled logic is allocated hardware resources, e.g., based on hardware elements of a device in which the circuit is to be implemented.

Following the allocation of 530, it is determined, at 540, whether 450 is complete. For example, 450 may be complete if constraints and/or targets are met by the scheduled and allocated design. However, 510-530 may be repeated multiple times regardless of whether constraints are met, e.g., enable comparison of multiple sets of clock domains, scheduling schemes, and/or allocations schemes. If it is determined at 540 that 450 is not complete, processing returns to 510. Otherwise, processing flows to 460 where structural description of the circuit design is generated. In addition to the structural description of the statements, the structural description may also include a structural description of clock gating circuitry for one or more gated clock domains.

Figure 6:
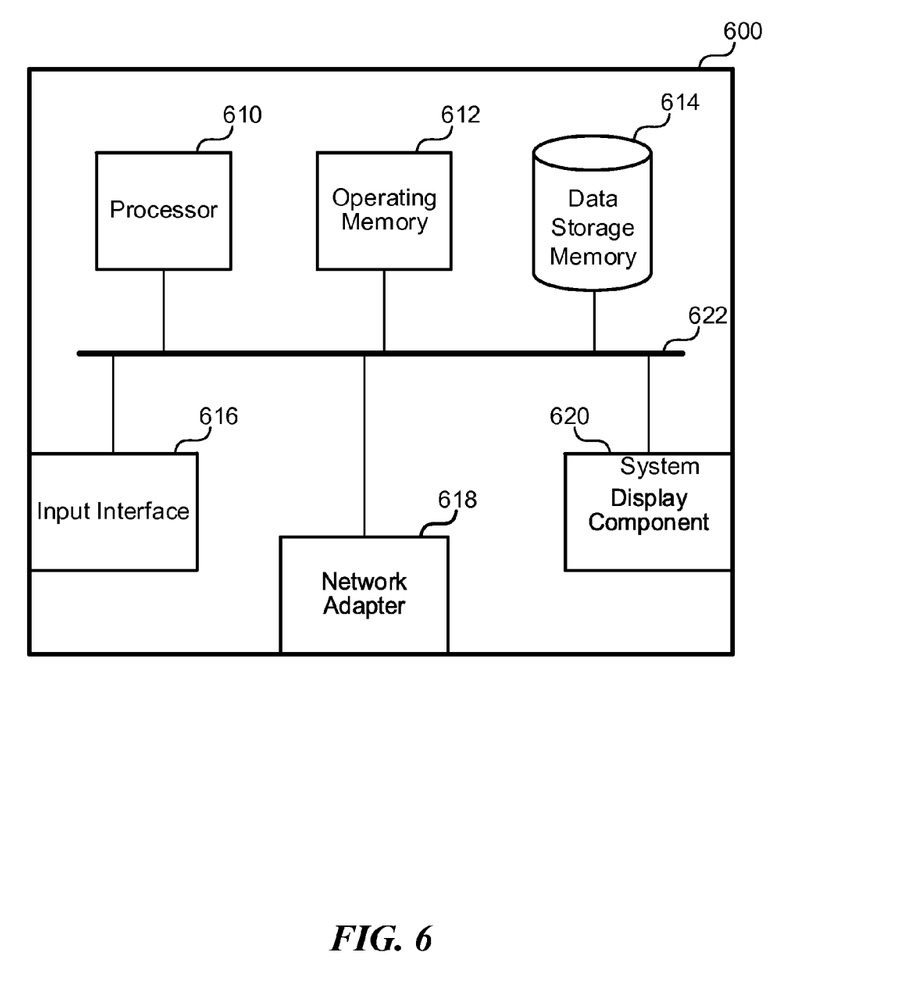
FIG. 6 is a block diagram illustrating example hardware components of a computing device according to aspects of the technology.

FIG. 6 is a high-level illustration of example hardware components of computing device 600, which may be used to practice various aspects of the disclosed technology. For example, computing device 600 may be employed to perform process 400 of FIG. 4. Computing device 600 may also be an example of the behavioral synthesis engine 112 of FIG. 1. As shown, computing device 600 includes processor 610, operating memory 612 data storage memory 614, input interface 616, network adapter 618, and display component 620. These aforementioned components may be interconnected by bus 622.

Computing device 600 may be virtually any type of general- or specific-purpose computing device. For example, computing device 600 may be a user device such as a desktop computer, a laptop computer, a tablet computer, a display device, a camera, a printer, or a smartphone. Likewise, computing device 600 may also be server device such as an application server computer, a virtual computing host computer, or a file server computer.

Computing device 600 includes at least one processor 610 adapted to execute instructions, such as instructions for implementing the above-described processes or technology. The aforementioned instructions, along with other data (e.g., datasets, metadata, operating system instructions, etc.), may be stored in operating memory 612 and/or data storage memory 614. In one example, operating memory 612 is employed for run-time data storage while data storage memory 614 is employed for long-term data storage. However, each of operating memory 612 and data storage memory 614 may be employed for either run-time or long-term data storage. Each of operating memory 612 and data storage memory 614 may also include any of a variety of data storage devices/components, such as volatile memories, semi-volatile memories, non-volatile memories, random access memories, static memories, disks, disk drives, caches, buffers, or any other media that can be used to store information. However, operating memory 612 and data storage memory 614 specifically do not include or encompass communications media, any communications medium, or any signals per se.

Also, computing device 600 may include or be coupled to any type of computer-readable media such as computer-readable storage media (e.g., operating memory 612 and data storage memory 614) and communication media (e.g., communication signals and radio waves). While the term computer-readable storage media includes operating memory 612 and data storage memory 614, this term specifically excludes and does not encompass communications media, any communications medium, or any signals per se.

Computing device 600 also includes input interface 616, which may be adapted to enable computing device 600 to receive input from users or from other devices. In one non-limiting example, input interface 616 may be adapted to receive directive 120 (FIG. 1) from a user. For example, directive 120 may define a clock domain gated by a particular condition. Directive 120 may also assign one or more statements to the defined gated clock domain. In addition, computing device 600 includes a display component 620, which may be adapted to render displays. In one example, display component 620 includes a frame buffer, graphics processor, graphics accelerator, or a virtual computing host computer and is adapted to render the displays for presentation on a separate visual display device (e.g., a monitor, projector, virtual computing client computer, etc.). In another example, display component 620 includes a visual display device and is adapted to render and present the displays for viewing.

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. A non-transitory computer-readable storage medium having instructions stored therein for causing a processor to perform a process of synthesizing a behavioral description of a circuit into a structural description of the circuit, the process comprising:

receiving the behavioral description of the circuit, the behavioral description including a first statement that is associated with a condition;
identifying the condition associated with the first statement;
identifying one or more other statements associated with the first statement, including:
   determining a downstream statement that depends on the first statement, and/or
   determining an upstream statement upon which the first statement depends;
inferring one or more potential clock domains gated by the condition for logic associated with the first statement and the one or more other statements;
scheduling the logic associated with the first statement and the one or more other statements according to the one or more potential clock domains; and
generating the structural description of the circuit, the structural description including a structural description of the scheduled logic.

2. The non-transitory computer-readable storage medium of claim 1, wherein the scheduling comprises:
   selecting a subset of the one or more inferred potential clock domains based on at least one criteria; and
   scheduling the logic associated with the first statement and the one or more other statements to the selected subset.

3. The non-transitory computer-readable storage medium of claim 1, wherein the process further comprises:
   determining that the condition is invariant across the one or more potential clock domains;
   in response to the determining that the condition is invariant, defining a common gated clock domain that encompasses the one or more potential clock domains, wherein the common gated clock domain is to be clocked by a clock signal gated by the condition; and
   scheduling the logic associated with the first statement and the one or more other statements to the defined common gated clock domain.

4. The non-transitory computer-readable storage medium of claim 3, wherein the scheduling comprises:
   scheduling the logic associated with the first statement and the one or more other statements into a plurality of pipeline stages of the defined common gated clock domain.

5. The non-transitory computer-readable storage medium of claim 1, wherein:
   the one or more potential clock domains include:
      a first clock domain clocked by a first gated clock, the first gated clock being gated by a derivative of the condition; and
      a second clock domain clocked by a second gated clock, the second gated clock being gated by the condition or another derivative of the condition; and
   the scheduling comprises:
      scheduling logic associated with the first statement to the first clock domain; and
      scheduling logic associated with the one or more other statements to the second clock domain.

6. The non-transitory computer-readable storage medium of claim 1, wherein the scheduling comprises:
   assigning, based on a user directive, logic associated with the first statement and at least some of the one or more other statements to a particular gated clock domain, the particular gated clock domain being gated by the condition.

7. The non-transitory computer-readable storage medium of claim 1, wherein the process further comprises:
   translating the behavioral description of the circuit into an intermediate representation of the circuit, the intermediate representation including:
      a data flow graph associated with the first statement; and
      a plurality of other data flow graphs; and
   analyzing the intermediate representation of the circuit, wherein the identifying the one or more other statements associated with the first statement is based on the analyzing the intermediate representation of the circuit.

8. The non-transitory computer-readable storage medium of claim 1, wherein the condition is a logical combination of two or more conditions, and wherein an operation associated with the first statement is to be performed based on a satisfaction of the two or more conditions.

9. The non-transitory computer-readable storage medium of claim 1, wherein the scheduling comprises:
   iteratively:
      evaluating the scheduled logic against at least a timing constraint and/or a power constraint; and
      scheduling the logic associated with the first statement and the one or more other statements to a subset of the one or more inferred potential clock domains based on the evaluating.

10. The non-transitory computer-readable storage medium of claim 1, wherein the scheduling comprises:
   scheduling the logic to a first subset of the one or more inferred potential clock domains clocked based on the condition;
   determining a power dissipation associated with the scheduled logic; and
   rescheduling the logic according to a second subset of the one or more potential clock domains in response to the determining a power dissipation.

11. A computing device for synthesizing a first description of a circuit into a second description of the circuit, comprising:
   a memory and a processor that are respectively adapted to store and execute instructions, including instructions organized into:
      a front-end component that:
         receives the first description of the circuit, the first description including a first statement that is associated with a condition;
         identifies the condition associated with the first statement; and
         determines a downstream statement that depends on the first statement and/or determines an upstream statement from which the first statement depends;
      a scheduler component that:
         infers one or more potential clock domains for logic associated with the first statement and for logic associated with the downstream statement and/or the upstream statement;
         determines that the condition is invariant across the one or more inferred potential clock domains; and
         schedules the logic associated with the first statement and one or more other statements with a particular clock domain gated by an invariant condition; and
      an output generator component that:
         generates the second description of the circuit, the second description including a description of the scheduled logic.

12. The computing device of claim 11, wherein the first description of the circuit is a behavioral description of the circuit and the second description of the circuit is a structural description of the circuit.

13. The computing device of claim 11, wherein the scheduler component also:
  evaluates the scheduled logic against at least a timing constraint and/or a power constraint to obtain an evaluation result; and
  based on the evaluation result, disassociates at least a portion of logic associated with the first statement and/or the upstream statement and/or the downstream statement from the particular clock domain.

14. The computing device of claim 11, wherein the scheduler component also:
  schedules logic associated with the first statement and the upstream statement and/or the downstream statement into pipeline stages associated with the particular clock domain.

15. The computing device of claim 11, wherein the instructions are further organized into:
  an input interface to
    receive a user directive that includes:
      a user defined clock domain gated by the condition; and
      an assignment of the first statement and at least another statement in the first description of the circuit to the user defined clock domain.

16. A processor-implemented method for synthesizing a behavioral description of a circuit into a structural description of the circuit, the method comprising:
  receiving the behavioral description of the circuit, the behavioral description including a first statement synthesizable into sequential logic that is to be conditionally clocked based on an evaluation of a condition associated with the first statement;
  identifying the condition associated with the first statement;
  identifying one or more other statements associated with the condition, including:
    identifying a downstream statement synthesizable into downstream logic that is dependent on the sequential logic; and/or
    identifying an upstream statement synthesizable into upstream logic upon which the sequential logic depends;
  inferring one or more clock domains for the sequential logic, and for the downstream logic and/or the upstream logic, the one or more inferred clock domains being clock gated based on the identified condition;
  using a processor, scheduling the sequential logic, and the downstream logic and/or the upstream logic, according to the one or more inferred clock domains; and
  using a processor, generating the structural description of the circuit, the structural description of the circuit including a structural description of the scheduled sequential logic.

17. The method of claim 16, further comprising:
  translating the behavioral description of the circuit into an intermediate representation of the circuit, the intermediate representation including
    a data flow graph for the first statement; and
    one or more other data flow graphs; and wherein
  identifying the one or more other statements comprises:
    analyzing the intermediate representation for one or more dependency relationships between the data flow graph for the first statement and the one or more other data flow graphs; and
    determining the one or more other statements based on one or more identified dependency relationships.

18. The method of claim 16, further comprising:
  determining that the condition is invariant across the one or more inferred clock domains;
  in response to the determining that the condition is invariant, defining a common clock domain that encompasses the one or more inferred clock domains, the common clock domain being clock gated based on the identified condition; and
  assigning the sequential logic, and the downstream logic and/or the upstream logic, to the common clock domain.

19. The method of claim 18, wherein the scheduling comprises:
  sequencing circuitry with which the sequential logic, and the downstream logic and/or the upstream logic, can be potentially implemented according to the common clock domain;
  evaluating the scheduled logic against at least a timing constraint and/or a power constraint; and
  in response to the evaluating, reducing a quantity of the circuitry assigned to the common clock domain.

20. The method of claim 16, wherein the scheduling comprises:
  associating circuitry for potentially implementing the sequential logic to a plurality of pipelined stages associated with a first gated clock domain, the first gated clock domain being gated by the condition or a derivative thereof; and
  associating circuitry for potentially implementing the downstream logic and/or the upstream logic to a plurality of pipelined stages associated with a second gated clock domain, the second gated clock domain being gated by the condition or another derivative thereof.

* * * * *